Patented Sept. 3, 1935

2,012,991

UNITED STATES PATENT OFFICE 2,012,991

AZO DYES AND METHODS FOR THEIR PREPARATION

Samuel Coffey, Huddersfield, and Wilfred Archibald Sexton, Manchester, England, assignors to Imperial Chemical Industries Limited, a corporation of Great Britain No Drawing. Application February 8, 1934, Serial No. 710,374. In Great Britain February 14, 1933

9 Claims. (Cl. 260—95)

This invention relates to new azo dyes and more particularly refers to azo dyes which may be lactamized and rendered insoluble by treatment with dilute mineral acids.

It is an object of this invention to produce new azo dyes which are fast to washing and which are well adapted to commercial use. A further object is to produce azo dyes which may be made insoluble by lactamization, preferably with dilute mineral acids. A still further object is to produce dyes containing the carboxyl group on the coupling component, and in which this carboxyl group may be eliminated by treatment with acids. Additional objects will appear hereinafter.

These objects are attained according to the present invention which in its preferred form comprises coupling a diazotized amine free from water-solubilizing groups, with an arylamide of 2,3-hydroxy-naphthoic acid having in the form of free acid the following general formula and free from water-solubilizing groups

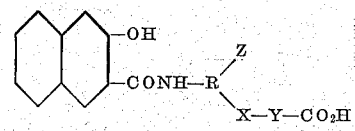

other than the one shown in the formula, and wherein R represents an aromatic nucleus, X represents —S—, —O—, or —NH—, Y represents —$CH_2$—, —CH(alkyl)—, or —C(alkyl)$_2$, and Z represents $NH_2$ or $NO_2$ the aforementioned groups being substituted on the aromatic nucleus R in ortho position to the group Z, and where when Z represents $NO_2$, the resulting azo compound is then treated in the customary manner, for instance with sodium sulphide, in order to reduce the nitro group to an amino group.

In British Patent 377,739 processes are described for producing new azo dyes by coupling diazotized or tetrazotized aromatic mono- or diamino compounds with an ortho-amino-aryl-thioglycollic acid.

We have now found that superior and particularly desirable results are obtained when one selects for the above purposes an ice-color coupling component, such as an arylide of 2,3-hydroxy-naphthoic acid, modified to this extent that it contains an ortho-amino and glycollic acid pair of radicals, adapted to be lactamized on the fiber. It seems that the lactam group formed on the fiber adds to the insolubility of the otherwise highly insoluble ice-color, and therefore produces an exceptionally fast color. Furthermore, our invention provides an alternative and novel method for producing ice-colors on the fiber, in addition to the known and usual procedure of impregnating the material with one of the components and coupling on the fiber.

These advantageous results may be attained by the use of numerous arylamides of 2,3-hydroxy-naphthoic acid capable of lactamization. For example, ortho-amino- or nitro- substituted compounds having the following group substituted in the ortho position to the amino or nitro group may be utilized:

$$X-Y-COOH$$

wherein X represents S, O or NH, and Y represents $CH_2$, CH(alkyl) or C(alkyl)$_2$.

This invention may be more readily understood by a consideration of the following illustrative examples, in which the quantities are stated in parts by weight.

*Example 1.*—3.53 parts of 5-chloro-o-toluidine are dissolved in 50 parts of 2N-hydrochloric acid and 50 parts of water. The base is diazotized below 10° C. by addition of 1.73 parts of sodium nitrite. The diazo solution is neutralized by addition of sodium bicarbonate.

16 parts of a 61% paste of the following arylamide

are agitated with 25 parts of 10% sodium carbonate and 250 parts of water. To this suspension is added the diazotized 5-chloro-o-toluidine. Coupling is almost instantaneous and the insoluble red dyestuff formed is filtered off and dried.

In place of the 5-chloro-o-toluidine there may be used any other diazotizable amine containing no solubilizing groups. For example 2,5-dichloroaniline gives a scarlet dyestuff, 5-nitro-o-anisidine a claret and 4-benzoylamino-2,5-dimethoxy-aniline and dianisidine give blues.

The arylamide used above is prepared as follows.

38.8 parts of the methyl ester of 2-nitro-4-aminophenylthioglycollic acid are mixed with 30.1 parts of 2,3-hydroxynaphthoic acid and 520 parts of dry toluene. The mixture is agitated at 60° C. and 9.6 parts of phosphorus trichloride admixed with 16 parts of toluene added. The mixture is raised to the boil and boiled gently under reflux for 16 hours. The mass is cooled and the yellow product filtered off, washed with dilute sodium carbonate and finally dried. The yield is 95% of theory m. p. 207–209° C. (Recrystallization from dichlorbenzene gives a product melting point of 212–214° C.).

20.6 parts of the unrecrystallized condensation product are stirred with 100 parts of boiling water and a solution of 24 parts of sodium sulphide crystals in 50 parts of water added during 15 minutes. The liquor is boiled for 1 hour, cooled and then treated with carbon dioxide until no further precipitation occurs. The precipitate is filtered and washed with 50 parts of water. It may be kept as a paste for use in the preparation of the dyestuffs. This treatment with sodium sulfide reduces the nitro group and hydrolyzes the ester, and the product is believed to have the formula already given.

*Example 2.*—The dyestuff made from 2,5-dichloroaniline as described in Example 1 may be applied in the following manner. 1 part of the solid dyestuff is dissolved in 500 parts of boiling water. 10 parts of wool or silk are added to the liquid, and this is maintained at 90–95° C., during the subsequent operations. 20 parts of 1% acetic acid, diluted with 30 parts of water are now added in small portions during half an hour. This causes liberation of the free acidic dyestuff, which then becomes adsorbed on the fibre. The wool is next rinsed with cold water and immersed in a bath of boiling dilute mineral acid, e. g. N/10 hydrochloric acid for 10 minutes. This causes lactamization, and a scarlet dyeing fast to washing is obtained.

*Example 3.*—The dyestuff made in substance in Example 1 may be made on the fibre as follows. 2 parts of a 60% paste of the arylamide used in Example 1 are dissolved in 400 parts of boiling water. 20 parts of wool or silk are added and steeped for five minutes at 90–95° C. 17 parts of 2% acetic acid, diluted with 30 parts of water are added in small portions during half an hour at 90–95° C. The wool is then rinsed and placed in a bath of the diazotized amine. The diazo solution should contain 1% of sodium acetate. Slow coupling takes place, the color developing on the fibre. Lactamization is then effected as described in Example 2. If it is so desired, lactamization may be effected before coupling with the diazo compound. In this case it is advisable to add 1% of sodium carbonate to the bath during coupling. Using a 4-chloro instead of 5-chloro-o-toluidine a red is obtained.

*Example 4.*—5.5 parts of 4-benzoylamino-2,5-dimethoxyanilide are dissolved in 6 parts of 36% hydrochloric acid and 100 parts of water. The solution is cooled to 5° C. and diazotized by the addition of 14 parts of 10% sodium nitrite. It is then neutralized by sodium bicarbonate and poured into a suspension of the p-thioglycollic acid of m-aminobenzoyl-m-aminoanilide of 2,3-hydroxynaphthoic acid (prepared as described below), in quantity equivalent to 10 parts of 100% material, in 25 parts of 10% sodium carbonate and 200 parts of water. After coupling, which takes place rapidly, the dyestuff is filtered off.

The m-aminobenzoyl-m-aminoanilide of 2,3-hydroxynaphthoic acid is prepared as follows.

7 parts of 2,3-hydroxynaphthoic-m-aminoanilide (prepared by reduction of the corresponding nitro compound) are mixed with 5.5 parts of 3-nitro-4-chlorobenzoyl chloride (prepared by the method of Montagne, Rec. Trav. Chim. 1900, 19, 46) and 100 parts of toluene. The mixture is heated gently under reflux until no more hydrogen chloride is evolved (which requires about 2½ hours).

The resulting condensation product melts at 225–228° C. and on recrystallization from dichloro-benzene at 226–229° C.

6 parts of sodium sulfide crystals together with 0.8 part of sulfur are dissolved in 100 parts of boiling alcohol. To this solution are added 25 parts of the above condensation product and the whole is heated under reflux for 6 hours. The mixture is then cooled and the insoluble organic disulfide filtered off. It is believed to have the structure (OH—C$_{10}$H$_6$—CONH—C$_6$H$_4$—NHCO—C$_6$H$_3$(NO$_2$)—S—)$_2$. 23 parts of the above organic disulfide are suspended in 200 parts of water. A solution of 25 parts sodium sulfide crystals are added and the temperature kept at 90–95° C. for 1 hour. This procedure reduces both the disulfide linkage and the nitro group, and yields the corresponding o-aminothiophenol (as sodium salt).

A solution of 7.5 parts of chloroacetic acid in 25 parts of water and the equivalent quantity of sodium hydroxide is now added and the mixture maintained at 90–95° C. for 1 hour. 60 parts of salt are then added and on cooling, the final product separates in the form of its sodium salt and is filtered.

The yields throughout are good.

An alternative method of preparation is as follows:—

23 parts of 1-(2',3'-hydroxynaphthoylamino)-3-(4''-chloro-3''-nitrobenzoylamino)-benzene, 4 parts of 95% thioglycollic acid, 4 parts of sodium hydroxide in 8 parts of water and 200 parts of methylated spirit are boiled under reflux for 6 hours and poured into 1000 parts of water at 80° C. The hot solution is acidified and the thioglycollic acid derivative

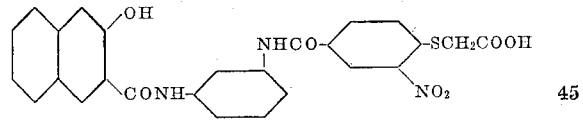

melting at 222–226° C. (with decomposition) filtered off; the yield is 75% of the theoretical= 20 parts.

10.3 parts of the above thioglycollic acid derivative are dissolved in a mixture of 250 parts of water and 15 parts of saturated sodium carbonate solution at the boil. 15 parts of 4N sodium sulfide solution are then added at 80° C. The resulting mixture is kept at this temperature for ½ hour, cooled and the amino derivative precipitated by the addition of salt.

*Example 5.*—The dyestuff in Example 4 may be applied in the following manner.

1.5 parts of dye (approximately 50% strength) are dissolved in 700 parts of boiling water and 10 parts of wool or silk are steeped in the blue solution at 90–95° for 10 minutes. 15 parts of 2% acetic acid, diluted with 35 parts of water are then added to the dyebath in small portions during half an hour. This causes liberation of the free acid dyestuff, which is taken up by the fibre. The dyed material is rinsed and the dyestuff lactamized by immersion for 10 minutes in hot dilute mineral acid, e. g. boiling N/10 hydrochloric acid.

A blue shade fast to washing is produced.

*Example 6.*—1.7 parts of 2,5-dichloroaniline are suspended in 30 parts of 2N hydrochloric acid and diazotized at 0–10° C. by the addition of 21 parts of 0.5N sodium nitrite solution. The resulting diazo solution is neutralized by the addition of sodium carbonate.

To a suspension of 4 parts of 2-nitro-5-(2',3'-hydroxynaphthoylamino) - phenylthioglycollic acid prepared as described below in a mixture of 20 parts of water and 1.2 parts of sodium carbonate there is added the above diazo solution. The resulting red dye is filtered and suspended in 50 parts of water and a solution of 4 parts of sodium sulphide crystals in 10 parts of water is added. The temperature is maintained at about 60° C. for 2 hours and the lactamizable dye is filtered and dried.

The above 2-nitro-5-(2',3'-hydroxynaphthoylamino)phenylthioglycollic acid is prepared as follows:—

To a mixture of 34 parts of 2,3-hydroxynaphthoic-3'-chloro-4'-nitroanilide, 7.6 parts of thioglycollic acid and 240 parts of methylated spirits there are added 12 parts of caustic soda dissolved in 3 parts of water and the resultant mixture is heated at the boil for 2 hours with stirring. It is then poured into 1000 parts of hot water (80° C.), the almost clear solution filtered off and acidified with hydrochloric acid, when the desired acid is precipitated. This is filtered off, washed and dried at 90° C.; the yield is 36 parts (90% theory), M. P. 225°.

*Example 7.*—An alternative method of making the dye obtained in Example 6 is as follows:—

To a solution of 21 parts of ferrous sulphate crystals in 45 parts of water there is added 10% aqueous sodium hydroxide until the mixture is alkaline. To this mixture there is added the sodium salt prepared from 4 parts of 2-nitro-5-(2',3'-hydroxynaphthoylamino)-phenylthioglycollic acid and the whole is stirred for 1½ hours at 80° C. It is then filtered and the filtrate evaporated to 120 parts.

To this filtrate there is added the diazo solution prepared from 1.7 parts of 2,5-dichloroaniline as described in Example 6. The resulting red dye is filtered and stirred with 100 parts of boiling water. The pure dye is then filtered off and dried.

*Example 8.*—The dye made by the methods of Examples 6 and 7 may be applied as follows:—

0.7 parts of dye are dissolved in 400 parts of boiling water. 10 parts of wool are added followed by 5 parts of 10% ammonium acetate. After keeping for 1 hour at 80–90° C. the wool is taken out and rinsed. The shade is a dull yellowish-scarlet. Lactamization is effected in a bath containing 5% of mineral acid for half an hour at 80° C. and the shade becomes brighter.

*Example 9.*—2 parts of the methyl ester of 2-nitro-4-(2',3'-hydroxynaphthoylamino)-phenylglycollic acid (prepared as described below) are boiled with 8 parts of 10% sodium carbonate and 60 parts of water and then cooled to between 0° and 10°. To this mixture, there is added a diazotized solution prepared from 0.9 part of 6-chloro-2-toluidine, 10 parts of 0.5N sodium nitrite solution and 15 parts of 2N hydrochloric acid, the diazo solution being first neutralized with sodium bicarbonate. The resulting red compound is filtered and suspended in 60 parts of water and 5 parts of 4N sodium sulfide solution and the mixture is stirred for 2 hours at 50–60° C. The resulting dye is filtered and dried.

The methyl ester of 2-nitro-4-(2',3'-hydroxynaphthoylamino)-phenylglycollic acid is prepared as follows:—

37.7 parts of the methyl ester of 2-nitro-4-aminophenylglycollic acid (Howard, Ber., 1897, 30, 547, 2106) are mixed with 32.3 parts of 2,3-hydroxynaphthoic acid and 500 parts of toluene, 10 parts of phosphorus trichloride are added and the mixture boiled under reflux with stirring until evolution of hydrogen chloride ceases. After cooling, the product is separated by filtration and freed from unreacted acid by washing with water containing sodium carbonate.

*Example 10.*—The dye of Example 9 may be applied as follows:—

0.4 parts of the dye are boiled with 400 parts of water and 15 parts of wool added. After keeping at 90° C. for 1½ hours the wool is dyed a bright scarlet shade. It is rinsed and finally lactamized by immersion for half an hour in a bath containing 5% of mineral acid.

*Example 11.*—To a boiling suspension of 4 parts of the methyl ester of 2-nitro-4-(2',3'-hydroxynaphthoylamino)-phenylglycollic acid in 20 parts of water there is gradually added a solution of 5 parts of sodium sulfide crystals in 10 parts of water. The resulting mixture is boiled for 1 hour, cooled and saturated with carbon dioxide. The resulting precipitate is filtered.

A suspension of the precipitate in 60 parts of water is added to the diazotized solution prepared from 2.5 parts of 3-nitro-4-toluidine, 30 parts of 0.5N sodium nitrite solution and 50 parts of 2N hydrochloric acid, the diazo solution being first neutralized with sodium bicarbonate. The resulting dye is filtered and freed from salt by boiling with 100 parts of water. It is only slightly soluble in water.

*Example 12.*—A paste containing 20.1 parts of sodium 5-(2',3'-hydroxynaphthoylamino)-4-chloro-2-aminophenylthioglycollate (prepared as described below) is dissolved in 1000 parts of water (containing 4 parts of sodium hydroxide) and to the solution there is added a diazotized solution prepared from 6.4 parts of p-chloroaniline, 3.5 parts of sodium nitrite, 28 parts of 36% hydrochloric acid and 100 parts of water, the diazo solution being first of all neutralized with soda ash. The red dyestuff is then salted out with 50 parts of salt and filtered off.

The sodium 5-(2',3'-hydroxynaphthoylamino)-4-chloro-2-aminophenylthioglycollate is prepared as follows:—

To a mixture of 48 parts of the 2,5-dichloro-4-nitroanilide of 2,3-hydroxynaphthoic acid, 13 parts of 95% thioglycollic acid and 400 parts methylated spirits there is added a solution of 16 parts of sodium hydroxide in 16 parts of water, the resulting mixture well stirred and heated to the boil for 1½ hours. The mixture is then added to 1300 parts of water at 80° C., the resulting solution is filtered and acidified, whereby 5(2',3'-hydroxynaphthoylamino)-4-chloro-2-nitrophenylthioglycollic acid is precipitated. This melts at 257–258° C.

21.6 parts of the above nitrophenylthioglycollic acid are well mixed with 240 parts of 4N sodium sulfide solution and the mixture rapidly heated to the boil for 3 minutes. On cooling the solution, sodium 5(2',3'-hydroxynaphthoylamino)-4-chloro-2-aminophenylthioglycollate separates and is filtered off and washed with saturated brine.

*Example 13.*—3 - (2',3'-hydroxynaphthoylamino)-6-nitro-4-methoxyphenylthioglycollic acid (prepared from 2,3-hydroxynaphthoic-5'-chloro-4'-nitro-2'-methoxyanilide and thioglycollic acid as described for 2-nitro-5-(2',3'-hydroxynaphthoylamino)-phenylthioglycollate in Example 6) is coupled with diazotized-2,5-dichloraniline and reduced as in preceding examples; a lactam dye is obtained.

*Example 14.*—The lactam dye of Example 13 is applied as described in Example 3.

*Example 15.*—Sodium - 2 - amino-4-(2',3'-hydroxynaphthoylamino) - phenylthiolactate prepared as described below, is coupled with diazotized 5-nitro-2-anisidine; it gives a red lactam dye.

The preparation of the thiolactate is as follows:—

To a boiling mixture of 570 parts of toluene, 29.6 parts of 2,3-hydroxynaphthoic acid and 40 parts of methyl-2-nitro-4-aminophenylthiolactate there is added gradually a mixture of 9.25 parts of phosphorus trichloride and 30 parts of toluene. The mixture is boiled for 16 hours, cooled and filtered.

The resulting solid is extracted with 100 parts methanol and leaves 57 parts of pure methyl-2-nitro-4-(2',3'-hydroxynaphthoylamino)-phenylthiolactate, m. p. 190–193° C.

21.3 parts of methyl-2-nitro-4-(2',3'-hydroxynaphthoylamino) - phenylthiolactate are intimately mixed with 120 parts 4N sodium sulfide solution and boiled under reflux for 5 minutes. The resulting mixture is cooled and the precipitated sodium 2-amino-4-(2',3' - hydroxynaphthoylamino)-phenylthiolactate is filtered and washed with saturated salt solution.

In the aforementioned examples the nitro group of the resulting azo compound was reduced with sodium sulfide; it is of course obvious that this is only one of the several well known methods of accomplishing this result.

The present invention permits the production of dyes having satisfactory fastness properties. These dyes may readily be rendered insoluble, and in all cases are understood to be capable of lactamization. This invention is of particular value in that it embraces and renders efficacious the selection of an exceedingly wide range of diazo bases and coupling components.

As many apparently widely different embodiments of this invention may be made without departing from the spirit and scope thereof, it is to be understood that the invention is not limited to the specific embodiments thereof except as defined in the appended claims.

In the claims below, the phrase "water-solubilizing group" should be understood as embracing the sulfonic acid and carboxylic acid groups, and their alkali-metal salts. These radicals are well known for their ability to impart water-solubility to aromatic compounds, and form a natural group, well recognized in the art. Also, in view of the capacity of our novel compounds of existing in three different forms, namely free acid form, salt form, and lactam form, and in view of the ready convertibility of these three forms into one another by simple treatment with acids or alkalis, respectively, it should be understood that the phrase "having in the form of its free acid the formula (so and so)" when referring to a compound or a dyestuff, is intended as a generic expression to cover all three forms.

We claim:

1. A process for making azo dyes, which comprises coupling a diazotized amine free from water-solubilizing groups, with an arylamide of 2,3-hydroxynaphthoic acid having in the form of its free acid the following general formula and free from water-solubilizing groups other than the $CO_2H$ group shown in the formula below

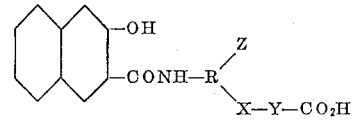

wherein R represents an aromatic nucleus of the benzene series, X represents —S—, —O—, or —NH—, Y represents —$CH_2$—, —CH(alkyl)—, —C(alkyl)$_2$, and Z represents $NH_2$ or $NO_2$, the aforementioned groups being substituted on the aromatic nucleus R in ortho position to the group Z, and where when Z represents $NO_2$, the resulting azo compound is then treated to reduce the nitro group to an amino group.

2. A process for making azo dyes, which comprises coupling a diazotized amine free from water-solubilizing groups, with an arylamide of 2,3-hydroxynaphthoic acid having in the form of its free acid the following general formula, and free from water-solubilizing groups other than the $CO_2H$ group shown in the formula below

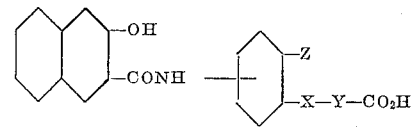

where X represents —S—, —O—, or —NH—, Y represents —$CH_2$—, CH(alkyl)—, —C(alkyl)$_2$—, and Z represents $NH_2$ or $NO_2$, and where Z represents $NO_2$, the resulting azo compound is then treated to reduce the nitro group to an amino group.

3. A process of producing azo coloring matter, which comprises coupling a diazotized aryl amine free from water-solubilizing groups, with an anilide of 2,3-hydroxynaphthoic acid, which is substituted in the anilide nucleus by a pair of ortho-positioned substituents of the formula Z and S—$CH_2CO_2M$, where Z stands for $NH_2$ or $NO_2$, while M stands for an alkali-metal, the hydroxynaphthoic acid nucleus and the anilide nucleus being both free of water-solubilizing groups except for the group S—$CH_2$—$CO_2M$ aforementioned.

4. An azo dye having in its structure a lactamizable ice-color coupling component which in the form of its free acid has the general formula

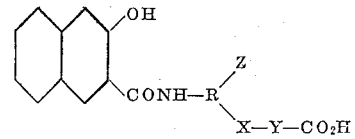

wherein R represents an aromatic radical of the benzene series, Z stands for $NH_2$ or $NO_2$, X stands for O, S or NH, and Y stands for one of the groups $CH_2$, CH(alkyl), and C(alkyl)$_2$, said dye being free from water-solubilizing groups other than the $CO_2H$ group shown, and the groups Z and X—Y—$CO_2H$ being located in the nucleus R in ortho position to each other.

5. An azo dye having in its structure a lactamizable ice-color coupling component which in the form of its free acid has the general formula

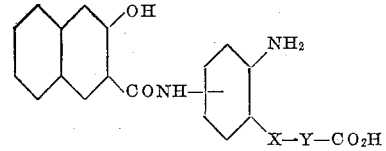

wherein X stands for O, S, or NH, and Y stands for a radical of the series $CH_2$, CH(alkyl) and C(alkyl)$_2$, said dye being free from water-solubilizing groups other than the $CO_2H$ group shown.

6. An azo dyestuff having in the form of its free acid the general formula

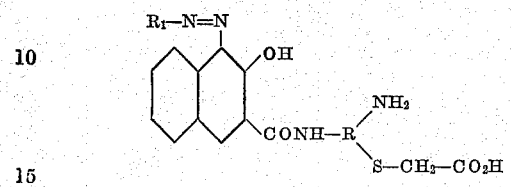

wherein $R_1$ is the radical of a diazotized arylamine, free from water-solubilizing groups, while R is an aromatic nucleus of the benzene series.

7. An azo dyestuff having in the form of its free acid the general formula

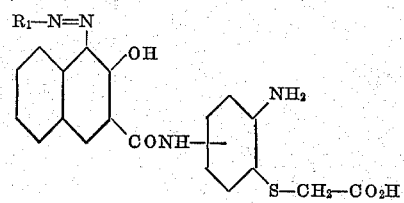

wherein $R_1$ is the radical of a diazotized arylamine, free from water-solubilizing groups.

8. Textile fabric when dyed with the lactam form of a dyestuff as defined in claim 4.

9. Textile fabric when dyed with the lactam form of a dyestuff as defined in claim 7.

SAMUEL COFFEY.
WILFRED ARCHIBALD SEXTON.